United States Patent [19]

Rudi

[11] Patent Number: 4,609,959
[45] Date of Patent: Sep. 2, 1986

[54] DEVICE FOR POSITIONING A MAGNETIC HEAD TO VARIOUS TRACKS OF A MAGNETIC TAPE

[75] Inventor: Guttorm Rudi, Fjellhamar, Norway

[73] Assignee: Tandberg Data A/S, Oslo, Norway

[21] Appl. No.: 555,152

[22] Filed: Nov. 25, 1983

[30] Foreign Application Priority Data

Nov. 29, 1982 [DE] Fed. Rep. of Germany ....... 3244149
May 16, 1983 [DE] Fed. Rep. of Germany ....... 3317719

[51] Int. Cl.$^4$ .................... G11B 21/08; G11B 21/22; G11B 5/55
[52] U.S. Cl. .................................. 360/106; 360/105; 360/109
[58] Field of Search ........................ 360/106, 105, 109

[56] References Cited

U.S. PATENT DOCUMENTS 4,491,890  1/1985  Rudi ................................... 360/106
4,559,571  12/1985  Olmsted et al. .................... 360/105

Primary Examiner—Robert S. Tupper
Attorney, Agent, or Firm—Hill, Van Santen, Steadman & Simpson

[57] ABSTRACT

A device for positioning a magnetic head into an operative position relative to a multi-track magnetic tape in a magnetic tape recorder. A magnetic head is disposed at one end of a magnetic head carrier while the opposite end of the head carrier is axially and laterally moveably mounted on a shaft attached to the tape recorder housing frame. A motor-driven worm gear engages a worm wheel mounted in an axially displaceable manner along the shaft. A spring mounted on the shaft urges the head carrier against the worm wheel so that upon rotation of the worm, the worm wheel is displaced along the shaft and moves the magnetic head perpendicularly to the running direction of the magnetic tape. A stop member is positioned adjacent the head carrier to prevent rotation of the head carrier during rotation of the worm wheel. In certain embodiments, the head carrier is pivotally mounted on the shaft in order to selectively pivot the magnetic head away from the operational working area thereof. The magnetic head carrier is seated in a bearing plate formed of a resilient material and on the shaft. After releasing the fastening of the bearing plate at one end thereof, the magnetic head and magnetic head carrier can be readily replaced by another magnetic head and carrier and precisely positioned by reattaching the bearing plate over the shaft.

10 Claims, 3 Drawing Figures

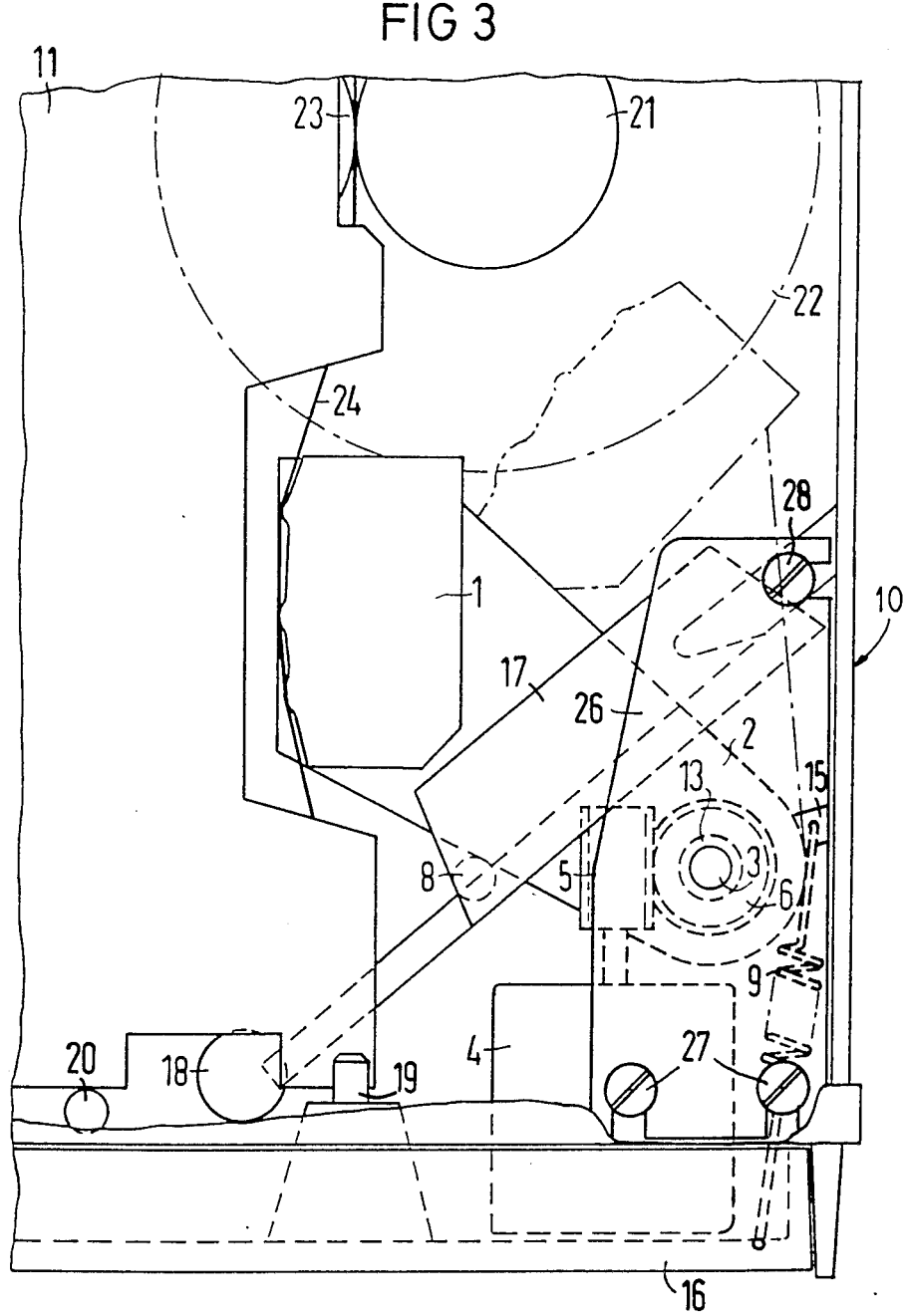

DEVICE FOR POSITIONING A MAGNETIC HEAD TO VARIOUS TRACKS OF A MAGNETIC TAPE

This application is related to U.S. Pat. No. 4,491,890, issued Jan. 1, 1985 and entitled "DEVICE FOR POSITIONING A MAGNETIC HEAD IN A MAGNETIC TAPE DEVICE"; U.S. application, Ser. No. 555,151 filed Nov. 25, 1983, entitled "MAGNETIC TAPE RECORDER"; and U.S. patent application No. 587,579, filed Mar. 8, 1984 entitled "MAGNETIC TAPE RECORDER.

BACKGROUND OF THE INVENTION

1. Field of the Invention

The invention relates to a device for positioning a magnetic head attached to a magnetic carrier to various tracks of a magnetic tape in a magnetic tape recording device.

2. Prior Art

A device for positioning a magnetic head to tracks of a magnetic tape in a magnetic tape recorder is described in German published patent application No. 31 12 895.5 filed Mar. 31, 1981 and corresponding to U.S. Pat. No. 4,491,890. With this known arrangement, the positioning of a magnetic head occurs upon employment of a worm drive and a screw drive connected to a drive motor, which can be a D.C. motor or a stepping motor. The worm drive is formed of a worm spindel gear secured to the output shaft of, for example, a stepping motor, and a corresponding worm wheel gear. The screw drive is formed of an inside thread of the worm wheel and a corresponding outside thread of a shaft. The magnetic head is secured to the shaft by a magnetic head carrier. The worm wheel is not displaceable in the axial direction. When the drive motor turns the worm wheel over the worm, the shaft is screwed out of or into the worm wheel, depending upon the direction of rotation. Since the magnetic head is secured to the shaft by the magnetic carrier and this carrier is correspondingly displaced in the direction of shaft movement, the magnetic head is thereby positioned to a select track of the magnetic tape in a magnetic tape recording device.

This known device is not intended for magnetic tape recorders having a particularly low overall height. Further, as a result of only a single-sided seating of the shaft, the arrangement allows for play between the various parts, however slight.

SUMMARY OF THE INVENTION

The invention provides a device for positioning a magnetic head to various tracks of a magnetic tape in a magnetic recording device which, on the one hand exhibits a particularly low overall height and which, on the other hand, exhibits an especially small amount of play between the various components thereof.

In accordance with the principles of the invention, a device for positioning a magnetic head to various tracks of a magnetic tape and having a magnetic head disposed on a magnetic head carrier which is postionable upon employment of a worm drive means and a screw drive means wherein the worm drive is formed of a worm spindel gear driven by a drive motor and an allocated or associated worm wheel gear and the screw drive is formed of an inside thread of the worm wheel and an associated outside thread on a shaft, is improved by mounting the shaft in a frame-fixed manner onto the housing frame of the tape recorder and arranging the magnetic head carrier so as to be displaceably disposed on the shaft and non-positively connected to the worm wheel while securing the magnetic head carrier against rotation during the rotation of the worm wheel but allowing the head carrier to follow the axial motion of the worm wheel.

The invention device has the advantage that it can be utilized in magnetic tape recorders having particularly small dimensions. A high degree of positioning precision and a particularly low amount of play are achieved as a result of the frame-mounted disposition of the shaft and a seating of the magnetic head carrier at points situated as far apart as possible. The magnetic head carrier can be pivoted in a simple manner so that the arrangement can be employed in magnetic tape recorders wherein the magnetic tape is contained in cassettes and these cassettes are inserted in the longitudinal direction, rather than the transverse direction, of the magnetic tape recorder. This type of magnetic tape recorder exhibits particularly small dimensions, not only in a vertical direction but also in a transverse direction. The inventive device is also suited for employment of cassettes wherein the sensing or working area accessible to a magnetic head is coverable by a dust cover.

A particularly good seating arrangement of the magnetic head carrier is achieved by seating the carrier on the shaft, both above and below the worm wheel. In order to achieve the lowest possible amount of play between the magnetic head carrier and the worm wheel, it is advantageous to provide a compression spring which is disposed concentrically relative to the shaft and arranged so as to press or urge the magnetic head carrier against the worm wheel. The compression spring may also be so designed that it exhibits a torsional force and urges the magnetic head carrier against a stop member in the working position of the magnetic head so as to prevent pivotal movement of the magnetic head carrier during the rotation of the worm wheel.

In order to maintain both the manufacturing cost as well as the assembly work and, in particular, the adjusment work when replacing the magnetic head carrier, as low as possible, it is advantageous for the shaft to be secured to the recorder housing frame at one end of the shaft and to be secured at the opposite end thereof by a bearing plate which is formed of a resilient material and which is immovably connected to the magnetic tape recorder housing at one end thereof and releasably connected to the housing at its opposite end. With this arrangement, only the releasable connection has to be undone during replacement of the magnetic head carrier. The shaft on which the magnetic head carrier is mounted can be removed from a bore in the bearing plate by simply bending the bearing plate away from the associated shaft end and slipping the carrier over the shaft. After insertion of a new magnetic carrier (having a magnetic head attached thereto) over the shaft and repositioning of the upper shaft end into the bore of the bearing plate, the releasable connection is simply tightened again without a new adjustment being necessary.

The magnetic head carrier, at the end thereof associated with the shaft, is preferably designed similar to a hollow cylindrical body that is provided with a recess in a wall thereof adjacent the area of the worm wheel so as to accommodate the wheel within the recess and to allow contact between the worm wheel and the worm spindle. The other or opposite end of the magnetic head carrier is preferably designed as a Z-shaped body in the area of the magnetic head, with the magnetic head being disposed on an upper leg portion thereof and the lower leg portion being connected to a lower end of the hollow cylindrical body.

It is advantageous for pivotal motion of the magnetic head carrier from a working or sensing position to an idle or non-sensing position to provide the magnetic head carrier with a projection member to which a traction mechanism can be secured. This traction mechanism is preferably in the form of a tension spring having one end thereof attached to the projection member and the other end attached to a cover of the magnetic tape recorder so that the magnetic head is pivoted into its idle position when the cover of the magnetic tape recorder is opened.

BRIEF DESCRIPTION OF DRAWINGS

FIG. 3 is a top plan view of the device shown in FIG. 1.

DESCRIPTION OF PREFERRED EMBODIMENT

Figure 1:
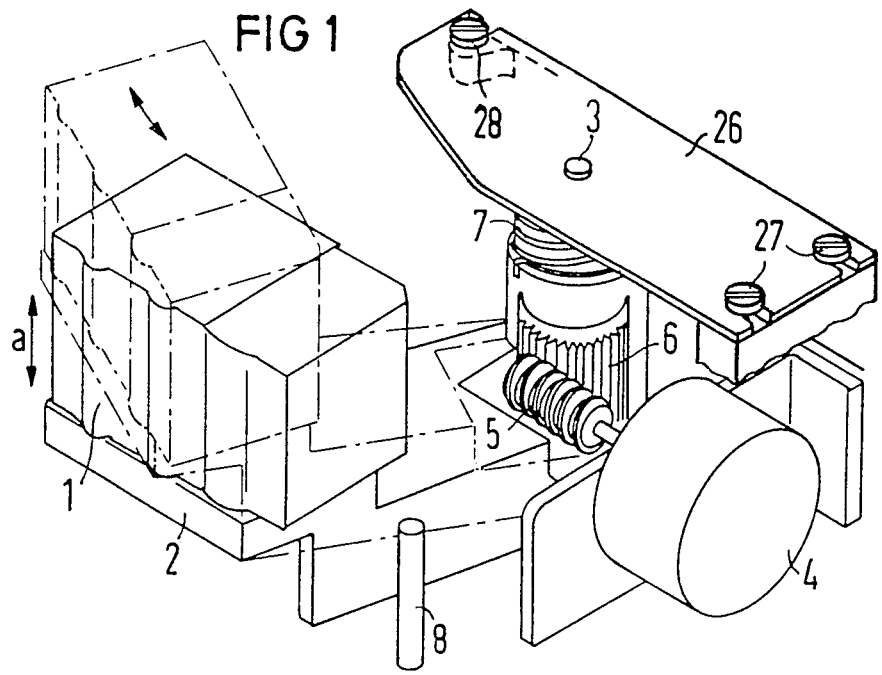
FIG. 1 is a perspective view of a device for positioning a magnetic head into a desired position, constructed and operable in accordance with the principles of the invention.

In the device or arrangement illustrated at FIG. 1, a magnetic head 1 is secured to a magnetic head carrier 2. The magnetic head carrier 2 is displaceable or moveable in the axial direction of a shaft 3 (schematically indicated by a double-headed arrow a) so that the magnetic head 1 can be positioned to a desired track of a magnetic tape (not illustrated). The displacement of the carrier 2 occurs upon employment of a drive motor 4 which drives a worm drive means, formed of a worm or worm spindle gear 5 and an associated worm wheel or worm wheel gear 6, which in turn drives a screw drive means formed of the worm wheel 6 and the shaft 3.

With a rotation of the output shaft of drive motor 4, which is preferably designed as a stepping motor, the worm wheel 6 is rotated across the worm 5. The worm wheel 6 is provided with an inside thread (not shown) which interacts with an outside thread (not shown) on the shaft 3 in the area of the worm wheel 6. The shaft 3 is mounted in a frame-fixed manner to the tape recorder housing (not shown) so that, depending on the direction of rotation of the worm 5, the worm wheel 6 moves up or down and to the right or left upon rotation of the worm wheel 6. The point of contact between the worm 5 and the worm wheel 6 thereby executes a helical motion.

In the area of the shaft 3, the magnetic head carrier 2 is designed like a hollow cylindircal body which is provided with a recess 3a (FIG. 2) in the vicinity of the worm wheel 6 for the drive by the worm 5. The magnetic head carrier 2 is biased or pressed against the worm wheel 6 by a compression spring 7 concentrically mounted on the shaft 3. At the same time, the compression spring 7 is also designed as a torsion spring and biases or urges the magnetic head carrier 2 against a stop memeber 8 and thus prevents rotation or pivoting of the magnetic head carrier 2 as a consequence of the rotation of worm wheel 6. Simultaneously with the axial motion of the worm wheel 6 during its rotation, the magnetic head carrier 2 and thus the magnetic head 1 as well, are displaced up or down. The magnetic head 1 can thus be positioned at different select tracks of a multi-track magnetic tape being played in a magnetic recording device by a corresponding plurality of drive pulses provided for the stepping motor 4.

A traction mechanism which is expediently designed as a tension spring, can be secured at one end thereof to the magnetic head carrier 2 for pivoting the magnetic head 1 from its work position into its idle position. The other end of the tension spring can, for example, be secured to a cover of the tape recorder housing so that the magnetic head 1 is pivoted into its idle position when the cover is opened. The traction mechanism is designed to overcome the torsional force of the compression spring 7. The pivotability of the magnetic head 1 between a work position and an idle position is particularly advantageous when the arrangement is used in a magnetic tape recording that uses magnetic tape cassettes and wherein the cassette are inserted or loaded in the longitudinal direction of the tape recorder. In this type of recorder, the magnetic head 1 must be withdrawn from a corresponding opening of the cassette during insertion and removal of the cassette.

The securement of the magnetic head carrier 2 in a magnetic tape recorder occurs at the shaft 3. At a lower end, the shaft 3 is disposed frame-fixed, preferably positively locked, in a lower bearing plate 29 in order to avoid rotation. At its upper end, the shaft 3 is inserted through a bore of an upper bearing plate 26. The bearing plate 26 is preferably formed of a resilient material (for example, (leaf spring material)) and is rigidly connected to the magnetic tape recorder housing at an end of the plate 26 by screws 27. The bearing plate 26 is provided with oblonge slots which are open at the end periphery of the plate at the locations of the scews 27 and 28. An adjustment of the magnetic head carrier 2 and, thus, of the magnetic head 1 can occur over a displacement of the bore in the bearing plate 26. After a precise adjustment, the bearing plate 26 is rigidly connected to the magnetic tape recorder housing frame by means of screws 27. A releasable connection is provided at the other end of the bearing plate 26, preferably by use of a screw 28. The device is ready to operate after the screw 28 has been adequately tightened.

Due to wear or the like, the magnetic head 1 must occassionally be replaced. The replacement of head 1 occurs in common with the replacement of the head carrier 2. During a replacement operation, the releasable connection (screw 28) is undone, the bearing plate 26 is bent upwardly and the shaft 3 is removed from the corresponding bore. Subsequently, the shaft 3 is removed from the lower bearing plate 29, the old magnetic head and magnetic head carrier slipped off of the shaft 3 and a new magnetic head-magnetic carrier unit is inserted in a corresponding manner. After the screw 28 has been retightened, no further adjustment for properly positioning the magnetic head is necessary.

Figure 2:
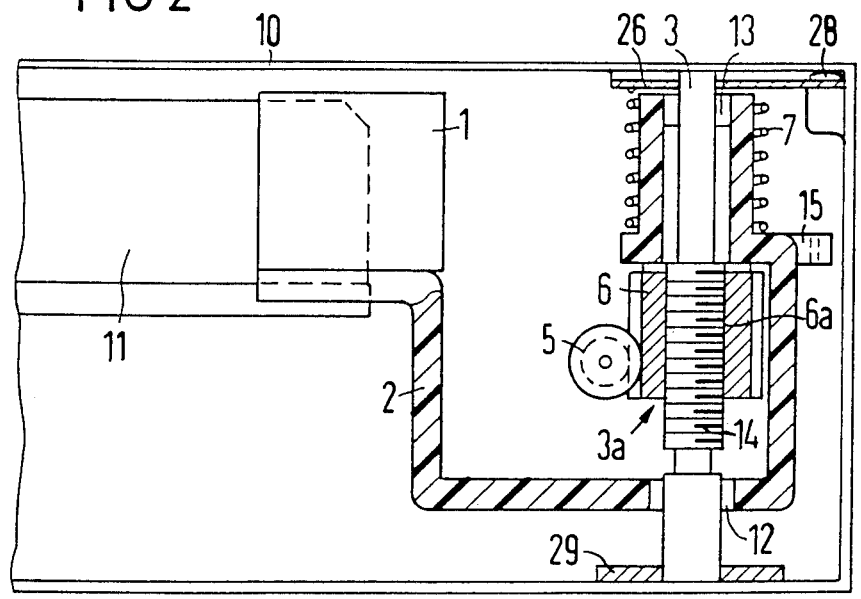
FIG. 2 is an elevated, partial cross-sectional view of the device shown in FIG. 1.

In the cross-sectional view of the inventive device shown at FIG. 2, the device is positioned in a magnetic tape recorder housing 10 which has a particularly low profile or overall height. The magnetic head 1 is illustrated in solid lines in a first work position and engaged in an opening of a cassette 11 which contains a magnetic tape (not shown). With the use of two bearings 12 and 13, the magnetic head carrier 2 is both axially displaceable as well as pivotably displaceable relative to the shaft 3. In instances where the pivotability of the magnetic head carrier 2 is undesirable or unnecessary, the bearings can, of course, be designed such that only a displacement in the axial direction of shaft 3 is possible.

At least in the area of the worm wheel 6, the shaft 3 is provided with an outside thread 14 that interacts with an inside thread 6a on the worm wheel 6. When the worm 5 turns, the worm wheel 6 is correspondingly driven so that the worm wheel 6 moves in the axial direction of shaft 3. The compression spring 7 presses the magnetic head carrier against the worm wheel 6 so that the magentic head carrier 2 follows the motion of the worm wheel in the axial direction and, thus, positions the magnetic head 1 to a select one or various tracke on a magnetic tape.

The shaft 3 is seated at its lower end at a base plate of housing frame 10 in a bearing plate 29 and is seated at its other or upper end in a bore or recess of bearing plate 26, being preferably inserted through the bore in the bearing plate 26 as shown.

A projection member 15 is disposed at the side of the magnetic head carrier 2 facing away from the magnetic head 1. The traction mechanism 9 (FIG. 3) acts on the projection 15 in order to pivot the magentic head 1 from its working position into its idle position upon insertion or removal of the cassette 11 into or from the magnetic tape recorder.

In the plane view illustrate at FIG. 3, the magnetic head 1 attached to the magnetic head carrier 2 is shown in solid lines in its work position, at which it engages into an opening of the cassette 11 and against a magnetic tape 24. The cassette 11 is inserted into the magnetic tape recorder in a longitudinal direction. A cover member 16 of the housing 10 is opened before cassette insertion. During such insertion of the cassette 11, a dust cover member 17 is automatically hinged out of the cassette 11. While the cover 16 is being closed, the traction mechansim 9 relaxes and the magnetic head 1 is pivoted behind the dust cover 17 into the opening of the cassette 11 due to the torsional forces exerted by compression spring 7. After the cover 16 has been closed, the cassette is locked in its final working position.

In the embodiment shown, locking occurs by means of three resiliently seated balls, of which only ball 18 is illustrated. A plurality of pins, of which only pins 19 and 20 are illustrated, provides points of reference for a define position of cassette 11 in the magnetic tape recorder. The magnetic tape 24 is driven with the aid of a drive capstan 21 which in turn is driven by a tape driven motor 22 and which presses the tapee 24 against a capstan idler 23.

After the magnetic head 1 is properly positioned in its working position, it is aligned with a desired track of the tape or, with a multi-track embodiment of a magnetic head, to desire tracks by means of the drive motor 4 as earlier described in conjunction with FIGS. 1 and 2.

Before removal of the cassette 11, the cover 16 is reopened, whereby the magnetic head 1 again pivots into its idle position (shown with dot-dash lines in FIG. 3) with the aid of the traction mechanism 9. The cassette 11 is partially ejected from the magnetic tape recorder by a spring and a dust cover 17 is hinged back into the opening of the cassette 11 at the same time. The cassette 11 can then be withdrawn from the magnetic tape recorder.

As is apparent from the foregoing specification, the invention is susceptible of being embodied with various alterations and modifications which may differ particularly from those that have been described in the preceding specification and description. For this reason, it is to be fully understood that all of the foregoing is intended to be merely illustrative and is not to be construed or interpreted as being restrictive or otherwise limiting of the present invention, excepting as it is set forth and defined in the hereto-appended claims.

I claim as my invention:

1. A device for positioning a magnetic head relative to a plurality of tracks of a magnetic tape in a magnetic tape recorder device, comprising:

a magnetic tape recorder housing frame having a shaft and means for mounting the shaft in a fixed manner and such that a longitudinal axis of the shaft extends in a given direction generally parallel to a width direction of the magnetic tape;

a magnetic head carrier mounted for axial movement along said shaft and having a magnetic head secured to a first end thereof;

a worm drive means and a screw drive means operationally associated with a second end of said head carrier for selectively positioning said magnetic head relative to selected tracks of the magnetic tape;

said worm drive means comprising a worm gear axially extending in a direction generally perpendicular to said given direction and driven by an associated drive motor and an associated worm wheel mounted about said shaft and axially extending generally parallel to said given direction and being axially and rotatably movable relative to said shaft;

said screw drive means comprising an inside thread on said worm wheel and an operationally associated outside thread on said shaft;

said magnetic head carrier being displaceably mounted on said shaft non-positively connected to said worm gear; and means for securing said magnetic head carrier against rotation during rotary movement of said worm wheel and for causing said head carrier to follow the axial movement of said worm wheel.

2. A device as defined in claim 1 wherein said magnetic head carrier is seated on said shaft above and below said worm wheel.

3. A device as defined in claim 1 wherein said magnetic head carrier is pivotable about the longitudinal axis of said shaft so as to permit movement of the magnetic head from a work position adjacent the tracks to an idle position in which the magnetic head is swung away from the magnetic tape.

4. A device as defined in claim 1 wherein a compression spring is positioned concentrically on said shaft and coacts with said means for mounting the shaft at one end thereof so that its other end biases said magnetic head carrier against said worm wheel.

5. A device as defined in claimed 4 wherein said compression spring simultaneously functions as a torsion spring which presses against a stop member for securing said magnetic head carrier against rotation.

6. A device as defined in claim 1 wherein said means for mounting the shaft secures it to the housing frame at one end thereof and secures its other end by a bearing plate having opposing ends and which is comprised of a resilient material, said bearing plate being connected to said magnetic tape recorder housing frame at a first end by first and second attachment means and connected to said housing frame at the opposite second end thereof by a single removable attachment means.

7. A device as defined in claim 6 wherein said bearing plate includes a bore in which an end of said shaft is mounted.

8. A device as defined in claim 6 wherein said bearing plate includes two oblong holes at the first end thereof and a single oblong hole at the second end thereof for receiving securing screws.

9. A device as defined in claim 1 wherein said magnetic head carrier is shaped at an end thereof in the area of said shaft somewhat like a hollow cylindrical body having a recess in the area of said worm wheel for the drive of said worm wheel and said head carrier is shaped at an end thereof, in the area of said magnetic head somewhat like a double-angled Z-shaped body with an upper portion thereof supporting said magnetic head and a lower portion thereof being attached to a lower end of said hollow cylindrical body.

10. A device as defined in claim 3 wherein means are connected between the housing frame and the magnetic head carrier for pivoting the magnetic head carrier from its work position into its idle position upon insertion of a cassette in the magnetic tape recorder device.

* * * * *